United States Patent
Oki

(10) Patent No.: US 8,648,996 B2
(45) Date of Patent: Feb. 11, 2014

(54) LIGHT-REFLECTING FILM AND PRODUCTION METHOD THEREOF

(75) Inventor: Kazuhiro Oki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 100 days.

(21) Appl. No.: 13/252,750

(22) Filed: Oct. 4, 2011

(65) Prior Publication Data

US 2012/0081653 A1    Apr. 5, 2012

(30) Foreign Application Priority Data

Oct. 4, 2010   (JP) .................................. 2010-225162

(51) Int. Cl.
G02F 1/13 (2006.01)
G02F 1/1335 (2006.01)
C09K 19/02 (2006.01)
B01F 5/06 (2006.01)

(52) U.S. Cl.
USPC ........... 349/195; 349/115; 349/176; 349/187; 366/336

(58) Field of Classification Search
USPC .................................................. 349/115, 195
See application file for complete search history.

(56) References Cited

U.S. PATENT DOCUMENTS

| | | | |
|---|---|---|---|
| 7,175,889 B2 * | 2/2007 | Ohkawa et al. ................. | 428/1.1 |
| 7,294,303 B2 | 11/2007 | Fukuoka et al. | |
| 7,510,741 B2 | 3/2009 | Pokorny et al. | |
| 7,652,736 B2 * | 1/2010 | Padiyath et al. .............. | 349/115 |
| 2006/0119783 A1 | 6/2006 | Fukuoka et al. | |
| 2006/0209238 A1 * | 9/2006 | Shiraogawa et al. ......... | 349/115 |
| 2007/0013095 A1 | 1/2007 | Sugitani | |
| 2007/0109673 A1 | 5/2007 | Padiyath et al. | |
| 2010/0103337 A1 * | 4/2010 | Takaku ........................... | 349/33 |
| 2011/0181820 A1 * | 7/2011 | Watanabe ..................... | 349/115 |
| 2012/0094118 A1 * | 4/2012 | Oki et al. ...................... | 428/354 |
| 2012/0218626 A1 * | 8/2012 | Hamada et al. ............... | 359/352 |

FOREIGN PATENT DOCUMENTS

| | | | |
|---|---|---|---|
| JP | 2001-205062 | | 7/2001 |
| JP | 2003-041015 A | | 2/2003 |
| JP | 3500127 B | | 2/2004 |
| JP | 3745221 B | | 2/2006 |
| JP | 2006258880 A | * | 9/2006 |
| JP | 3903101 B | | 4/2007 |
| JP | 3903101 B2 | * | 4/2007 |
| JP | 4008358 B | | 11/2007 |
| JP | 2008-501147 | | 1/2008 |
| JP | 4109914 B | | 7/2008 |
| JP | 2009-514022 A | | 4/2009 |
| WO | 2007-010738 | | 1/2007 |

OTHER PUBLICATIONS

Machine Translation of Japenese Patent 3903101 B2.*
Machine Translation of Japenese Application Publication 2006-258880 A.*
Yumoto et al., "Study of Photosensitive Chiral Compounds for Cholesteric Liquid Crystals Directed toward the Color Filter for Liquid Crystal Display", Fujifilm Research & Development No. 50/2005 pp. 60-63.
Japanese Official Action-2010-225162-Feb. 5, 2013.

* cited by examiner

Primary Examiner — Edward Glick
Assistant Examiner — Mark Teets
(74) Attorney, Agent, or Firm — Young & Thompson

(57) ABSTRACT

A method of producing a light-reflecting film having a light-reflecting layer on a resin film and reflecting 30% or more of incident light of a wavelength in the range of 800 to 2000 nm, includes a step of curing a cholesteric liquid crystal phase to form the light-reflecting layer, the cholesteric liquid crystal phase is obtained by mixing a chiral agent having an HTP of 30 $\mu m^{-1}$ or more expressed by Expression 1 into a starting solution by an in-line mixing method while supplying the starting solution prepared by dissolving a curable liquid crystal compound in a solvent, coating the resin film with the resultant coating solution, and drying the resultant.

19 Claims, 2 Drawing Sheets

LIGHT-REFLECTING FILM AND PRODUCTION METHOD THEREOF

BACKGROUND OF THE INVENTION

1. Field of the Invention

The present invention relates to a light-reflecting film that has a layer formed by fixing a cholesteric liquid crystal phase and that reflects infrared light, and a production method thereof.

2. Description of the Related Art

With the recent increase of concern over and interest in environment or energy, energy-saving industrial products have been increasingly demanded. For example, glass and films have been required which could effectively shield glass windows of houses or vehicles from heat, that is, effectively reduce the thermal load due to sunlight. In order to reduce the thermal load due to sunlight, it is necessary to prevent the transmission of some solar rays in the visible light region or the infrared light region in a solar light spectrum. Particularly, from the viewpoint of safety, high transmittance in the visible light region and heat-shielding performance are actively required for vehicle windows and the reflectance of sunlight tends to be regulated in some countries.

Multi-layered glass coated with a special metal film blocking heat radiation, which is called low-E double glazing, is frequently used as echo-glass having high heat-insulating performance or high heat-shielding performance. The special metal film can be produced by laminating plural layers, for example, by the use of a vacuum film-forming method. The coating of the special metal film produced by the use of the vacuum film-forming method is very excellent in reflection performance, but the vacuum process is low in productivity, whereby the production cost thereof is high. When a metal film is used, there is a problem in that electromagnetic waves are also shielded to cause radio interference when using mobile phones or the like. Furthermore, when a metal film is used for vehicles, use of ETC system may be prevented. High transmittance of visible rays is required as well as the radio interference for vehicle windows in view of safety.

On the other hand, a method using a cholesteric liquid crystal phase has been suggested. For example, a laminated optical film in which reflective circularly-polarizing films disposed to transmit circularly-polarized light having the same direction are formed on both surfaces of a cholesteric liquid crystal phase is disclosed in JP4109914B.

An infrared light reflecting article having a cholesteric liquid crystal phase is disclosed in JP2009-514022A. A configuration in which plural cholesteric liquid crystal phase layers are laminated to efficiently reflect light in the visible light region, which is used for a liquid crystal display, is disclosed in JP3500127B.

In laminating plural cholesteric liquid crystal phase layers, for example, a method of drying, heat-orienting, and UV-curing of a coating film containing a cholesteric liquid crystal material and repeating the above steps to laminate a cholesteric liquid crystal phase layer by layer on the previously formed cholesteric liquid crystal phase is used. Regarding the method of curing a cholesteric liquid crystal phase, a method of applying UV rays to a polymerizable liquid crystal is generally used, for example, as disclosed in JP4008358B. JP4008358B discloses a method of producing a cholesteric liquid crystal film of which the reflection wavelength band is wide by adjusting the illumination intensity in a predetermined range. JP3745221B discloses a method of producing a polarizer in which the wavelength region is continuous by setting the rotation directions of liquid crystal molecules in each of cholecteric liquid crystal phases to be identical at the time of laminating the cholesteric liquid crystal phases. JP3903101B discloses a method of diluting a starting solution by in-line mixing of an additive to the starting solution so as to prevent coating streaks. JP2003-41015A discloses a method of mixing an additive by in-line mixing and stably applying an unstable starting solution.

SUMMARY OF THE INVENTION

In order to produce a light-reflecting film having high heat-shielding performance, it is necessary to reflect infrared light with high reflectance and to precisely control a reflection wavelength band. In order to control the reflection wavelength band to reflect light of a long wavelength (in an infrared light region), a chiral agent is generally added to a liquid crystal compound (for example, a rod-like liquid crystal compound) exhibiting a cholesteric liquid crystal phase while adjusting the concentration to adjust the reflection wavelength band. In this case, it is necessary to qualitatively reduce the additive amount of the chiral agent to shift the reflection wavelength to the long wavelength side (to the infrared light region).

In order to reflect infrared light with high reflectance, it is necessary to improve the orientation property of the cholesteric liquid crystal phase. This leads to disappearance of orientation defects of the light-reflecting film and a decrease in a haze. As a result, the reflectance of the light-reflecting film is improved.

HTP is generally used as an indicator indicating the performance of a chiral agent. HTP is an abbreviation of Helical Twisting Power and is a factor indicating the helical twisting power expressed by Expression 1. Specifically, refer to "Study of Photosensitive Chiral Compounds for Cholesteric Liquid Crystals Directed toward the Color Filter for Liquid Crystal Display" (written by Masatoshi Yumoto and Mitsuyoshi Ichihashi, Fuji Film Research Report No. 50 (2005), pp. 60-63).

$$\text{HTP} = \text{Refractive Index of Liquid Crystal}/(\text{Reflection Wavelength} \times \text{Concentration of Chiral Agent}) \quad \text{Expression 1}$$

Accordingly, in order to produce a light-reflecting film which can shift the reflection wavelength to the long wavelength side so as to reflect the infrared light and which has a superior orientation property, it is necessary to adjust the reflection wavelength using a small amount of chiral agent having a high HTP.

However, the inventor attempted to produce a light-reflecting film having high heat-shielding performance using a small amount of chiral agent having a high HTP and could see that the influence of the precision in additive concentration of the chiral agent on the shift in wavelength is markedly greater than the influence of the other various production conditions. That is, it could be seen that the reflection wavelength of a light-reflecting film may not correspond to a target reflection wavelength or an orientation defect may occur due to a slight difference in additive concentration of the chiral agent, thereby causing a haze. The reflection wavelength of the light-reflecting film is not determined only depending on the mixing ratio of materials used, but varies depending on the orientation state of the formed film. Accordingly, in order to precisely adjust the reflection wavelength of the light-reflecting film, the re-production of a coating solution might be necessary. In the case where the chiral agent having a high HTP is used in order to obtain a characteristics in which 30% or more of incident light in the long wavelength region (for example, the infrared light region of 800 to 2000 nm) is reflected, the problem in that it is necessary to control the additive concentration of the chiral agent with much higher precision than considered in the past was not known, and it was not also known that the influence of the additive concentration of the chiral agent is markedly greater than the influence of the other various production conditions.

A problem to be solved by the invention is to provide a method of producing a light-reflecting film which can provide the light-reflecting film excellent in reflection performance in an infrared light region and orientation performance.

The inventor performed diligent studies to solve the above-mentioned problem. As the study result of the known method of producing a light-reflecting film using a liquid crystal compound so as to control the additive concentration of the chiral agent, the inventor found that it is possible to control the additive concentration of a chiral agent with high precision to solve the above-mentioned problem, by in-line mixing of the chiral agent.

That is, according to an aspect of the invention, there is provided a method of producing a light-reflecting film having a light-reflecting layer on a resin film, and reflecting 30% or more of incident light of a wavelength in the range of 800 to 2000 nm, the method including: a step of curing a cholesteric liquid crystal phase to form the light-reflecting layer, the cholesteric liquid crystal phase is obtained by mixing a chiral agent having an HTP of 30 $\mu m^{-1}$ or more expressed by Expression 1 into a starting solution by an in-line mixing method while supplying the starting solution prepared by dissolving a curable liquid crystal compound in a solvent, coating the resin film with the resultant coating solution, and drying the resultant.

HTP=Refractive Index of Curable Liquid Crystal Compound/{Selective Reflection Wavelength (unit: μm) of Cholesteric Liquid Crystal Phase× Ratio of Chiral Agent to Curable Liquid Crystal Compound}  Expression 1

According to another aspect of the invention, there is provided a method of producing a light-reflecting film having a 30% or more of incident light of a wavelength in the range of 800 to 2000 nm, the method comprising the steps of: (a) dissolving a curable liquid crystal compound in a solvent in a starting solution storage tank; (b) supplying the starting solution to a coater via a liquid supply pipe from the starting solution storage tank by the use of a pump; (c) mixing a solution containing a chiral agent having an HTP of 30 $\mu m^{-1}$ or more expressed by Expression 1 into the supplied starting solution in the liquid supply pipe by an in-line mixing method; (d) coating the resin film with the resultant curable liquid crystal composition; (e) drying the coated curable liquid crystal composition to form a cholesteric liquid crystal phase; and (f) fixing the cholesteric liquid crystal phase by proceeding a curing reaction of the curable liquid crystal composition to form the light-reflecting layer.

HTP=Refractive Index of Curable Liquid Crystal Compound/{Selective Reflection Wavelength (unit: μm) of Cholesteric Liquid Crystal Phase× Ratio of Chiral Agent to Curable Liquid Crystal Compound}  Expression 1

In the method of producing a light-reflecting film according to the aspects of the invention, it is preferable that the mixing process of the chiral agent is carried out by the use of a static mixer disposed in the liquid supply pipe, that at least one kind of cholesteric liquid crystal compound is used as the curable liquid crystal compound, that the curable liquid crystal composition contains a photopolymerization initiator, that the curable liquid crystal composition contains an orientation-control agent, that the amount of the chiral agent added to the curable liquid crystal compound is 5.1% by mass or smaller, that the HTP of the chiral agent is in the range of 35 to 95 $\mu m^{-1}$, and that the central reflection wavelength of the light-reflecting film is in the range of 950 to 2000 nm.

In the method of producing a light-reflecting film according to the aspects of the invention, it is preferable that the method further includes the steps of: measuring the central reflection wavelength; and controlling the amount of the chiral agent added by feedback from the measured central reflection wavelength, that the method further includes a step of (g) laminating another light-reflecting layer on the light-reflecting layer by changing the concentration or kind of the chiral agent and repeatedly performing the steps of (a) to (f) at least once, that at least a light-reflecting layer reflecting right-handed circularly polarized light and a light-reflecting layer reflecting left-handed circularly polarized light are formed by the use of the method, that the resin film is a polyethylene terephthalate film, and that the method is a method of producing a light-reflecting film for attaching to a window.

According to still another aspect of the invention, there is provided a light-reflecting film produced by the above-mentioned method having a wavelength region to reflect 30% or more of incident light in the infrared light region of 800 to 2000 nm.

In the light-reflecting film according to the aspect of the invention, it is preferable that at least a light-reflecting layer which contains a chiral agent having an HTP of 30 $\mu m^{-1}$ or more expressed by Expression 1, has a haze of 0.2% or less, and is formed by fixing a cholesteric liquid crystal phase is laminated.

HTP=Refractive Index of Curable Liquid Crystal Compound/{Selective Reflection Wavelength (unit: μm) of Cholesteric Liquid Crystal Phase× Ratio of Chiral Agent to Curable Liquid Crystal Compound}  Expression 1

According to the aspects of the invention, it is possible to provide a method of producing a light-reflecting film having superior reflection performance in the infrared light region and superior orientation performance.

DESCRIPTION OF THE PREFERRED EMBODIMENTS

Figure 1:
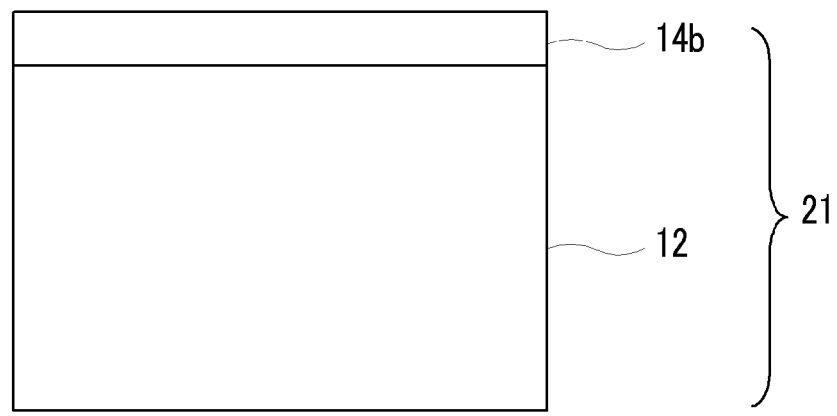
FIG. 1 is a cross-sectional view schematically illustrating an example of a light-reflecting film produced by a production method according to the invention.

Hereinafter, the invention will be described in detail. The following constituent elements will be described with reference to a representative embodiment of the invention, but the invention is not limited to the embodiment. In the following description, "in the range of xx to yy" means that it includes numerical values designated by "xx" and "yy" as a lower limit and an upper limit, respectively.

Method of Producing Light-Reflecting Film

A first aspect of the invention provides a method of producing a light-reflecting film having a light-reflecting layer on a resin film, and reflecting 30% or more of incident light of a wavelength in the range of 800 to 2000 nm, the method including: a step of curing a cholesteric liquid crystal phase to form the light-reflecting layer, the cholesteric liquid crystal phase is obtained by mixing a chiral agent having an HTP of 30 $\mu m^{-1}$ or more expressed by Expression 1 into a starting solution by an in-line mixing method while supplying the starting solution prepared by dissolving a curable liquid crystal compound in a solvent, coating the resin film with the resultant coating solution, and drying the resultant.

HTP=Refractive Index of Curable Liquid Crystal Compound/{Selective Reflection Wavelength (unit: μm) of Cholesteric Liquid Crystal Phase× Ratio of Chiral Agent to Curable Liquid Crystal Compound}   Expression 1

A second aspect of the invention provides a method of producing a light-reflecting film having a light-reflecting layer on a resin film, and reflecting 30% or more of incident light of a wavelength in the range of 800 to 2000 nm, the method comprising the steps of: (a) dissolving a curable liquid crystal compound in a solvent in a starting solution storage tank; (b) supplying the starting solution to a coater via a liquid supply pipe from the starting solution storage tank by the use of a pump; (c) mixing a solution containing a chiral agent having an HTP of 30 $\mu m^{-1}$ or more expressed by Expression 1 into the supplied starting solution in the liquid supply pipe by an in-line mixing method; (d) coating the resin film with the resultant curable liquid crystal composition; (e) drying the coated curable liquid crystal composition to form a cholesteric liquid crystal phase; and (f) fixing the cholesteric liquid crystal phase by proceeding a curing reaction of the curable liquid crystal composition to form the light-reflecting layer.

The method of producing a light-reflecting film according to the invention is also referred to as a production method according to the invention.

HTP

First, Expression 1 will be described.

The helical orientation power of a chiral agent can be expressed by HTP (Helical Twisting Power). Here, the refractive index of a curable liquid crystal compound in Expression 1 means the following, for example, as described in page 20 of "Lightwave Engineering (written by Yasuo Kokubun, published by Kyoritsu Publishing Co. (1999))".

Ratio n of Phase speed c in Vacuum to Phase Speed $v_p$ in Medium (Curable Liquid Crystal Compound)=$c/v_p$ The selective reflection wavelength of a cholesteric liquid crystal phase means a wavelength obtained by multiplying a chiral pitch (helical pitch) of cholesteric liquid crystal molecules by the average refractive index of the cholesteric liquid crystal molecules. The concentration of the chiral agent relative to the curable liquid crystal compound means the ratio of the mass (weight) of the liquid crystal compound per unit volume to the solid content mass (weight) of the chiral agent per unit volume. If the HTP is high, it means that the helical orientation power is high and it is possible to produce a light-reflecting layer having a low haze, which is preferable. As can be clearly seen from Expression 1, a high HTP can be achieved by raising the refractive index of the curable liquid crystal compound or lowering the concentration of the chiral agent. Therefore, it is important that a material exhibiting a low haze with a small additive amount is selected as the chiral agent. In order to reflect light of a longer wavelength such as infrared light, it is necessary to raise the helical orientation pitch of the cholesteric liquid crystal molecules and thus the film thickness of the cholesteric liquid crystal phase increases. In this case, it is difficult to orient the liquid crystal molecules. Accordingly, when it is intended to produce a film reflecting light of a long wavelength with high reflectance, it is necessary to select a chiral agent exhibiting a high HTP.

The HTP of the chiral agent is preferably in the range of 30 to 95 $\mu m^{-1}$, more preferably 35 $\mu m^{-1}$ or greater, and still more preferably in the range of 40 to 95 $\mu m^{-1}$.

Here, the HTP of the chiral agent can be determined by experimentally acquiring the dependency of a selective wavelength on the chiral agent concentration and can be determined uniquely.

Reflection Wavelength

The production method according to the invention is a method of producing a light-reflecting film having a light-reflecting layer on a resin film, and reflecting 30% or more of incident light of a wavelength in the range of 800 to 2000 nm (that is, at least any one of wavelength in the range of 800 to 2000 nm). The production method according to the invention is obtained by discovering a problem in that it is difficult to obtain a light-reflecting film having superior reflection performance and superior orientation performance in the infrared light region which is a long wavelength band by adding a chiral agent by the use of the known production method when forming the light-reflecting layer reflecting light of a wavelength in the infrared light region as a long wavelength and solving the problem. It is known that a specific wavelength region of which light is reflected by the light-reflecting film can be shifted by various factors of the production method thereof. It is possible to shift the specific wavelength region by adjusting the conditions such as the temperature, the illumination intensity, and the illumination time when curing the cholesteric liquid crystal phase, in addition the additive concentration of the chiral agent. Here, the reflection wavelength region is the same as the selective reflection wavelength in Expression 1.

The method of producing a light-reflecting film according to the invention can be more preferably used for producing a light-reflecting film which reflects 50% or more of incident light of a wavelength in the range of 800 to 2000 nm.

The invention is made by discovering that the influence of the additive concentration of the chiral agent is very high when forming the light-reflecting layer reflecting light of a long wavelength in the infrared light region. The production method according to the invention can solve the above-mentioned problem by controlling the additive concentration of the chiral agent with high precision.

The production method according to the invention can be preferably used to produce a light-reflecting film of which the central reflection wavelength is in the range of 950 to 2000 nm and can be more preferably used to produce a light-reflecting film of which the central reflection wavelength is in the range of 950 to 1400 nm. Here, the central reflection wavelength is calculated by an expression λ=n·pitch (where n represents the average refractive index of liquid crystal and pitch represents the helical pitch (nm) of the cholesteric liquid crystal), but the half-value width center of the reflection spectrum may be simply set as the central reflection wavelength.

Production Steps

Materials or steps preferably used in the method of producing a light-reflecting film according to the invention will be sequentially described below on the basis of the second aspect of the invention.

Step (a)

In the production method according to the first aspect of the invention, a starting solution in which a curable liquid crystal compound is dissolved in a solvent in advance may be used or the curable liquid crystal compound may be dissolved in a solvent when producing the light-reflecting film. The starting solution may be prepared in a batch manner or in a continuous manner.

The production method according to the second aspect of the invention includes a step (a) of preparing a starting solution by dissolving a curable liquid crystal compound in a solvent in a starting solution storage tank.

The curable liquid crystal composition used in the invention is prepared as a solution or a dispersion in which materials (solid) are dissolved or dispersed in a solvent. In the step (a), the curable liquid crystal composition containing solid (excluding a chiral agent) such as a photopolymerization initiator or an orientation-control agent to be described later in addition to the curable liquid crystal compound and the solvent may be prepared as a solution or a dispersion within a tank or the like.

In the production method according to the invention, it is preferable that the curable liquid crystal composition contain a photopolymerization initiator. The photopolymerization initiator may be added when preparing the starting solution or may be added at the same time as the in-line mixing of the chiral agent.

In the production method according to the invention, it is preferable that the curable liquid crystal composition contain an orientation-control agent. The orientation-control agent may be added when preparing the starting solution or may be added at the same time as the in-line mixing of the chiral agent.

Details of the components used in the invention will be described later, but the orientation-control agent is not particularly limited as long as it is an orientation-control agent which can control the orientation of the curable liquid crystal compound.

Step (b)

In the production method according to the first aspect of the invention, the method of supplying the starting solution is not particularly limited. The dynamic power of a pump or the like may be used or the starting solution may be supplied naturally with the gravitational force thereof. The starting solution may be supplied through a liquid supply pipe extending to a coater or may be supplied through a liquid supply pipe extending to a device temporarily storing a coating solution other than the coater.

The production method according to the second aspect of the invention includes a step (b) of supplying the starting solution from the starting solution storage tank to the coater via the liquid supply pipe. The prepared starting solution is preferably supplied to a coating head by the use of a pump.

Step (c)

In the production method according to the first aspect of the invention, the method of inline-adding the chiral agent to the starting solution is not particularly limited. The chiral agent may be added as a chiral agent solution in which the chiral agent is dissolved in a solvent. When the chiral agent is liquid, the chiral agent may be added as a liquid which is a chiral agent simple or may be dissolved and added as a chiral agent solution as needed. The chiral agent may be added as solid. It is preferable that the chiral agent be added in a state where the chiral agent is dissolved in a solvent.

On the other hand, the production method according to the second aspect of the invention includes a step (c) of mixing a solution (a chiral agent solution) containing the chiral agent into the supplied starting solution in the liquid supply pipe by an in-line mixing.

At least one kind selected from solvents for preparing a starting solution to be described later can be used as the solvent used to prepare the chiral agent solution. The solvent used to prepare the chiral agent solution is preferably the same as the solvent used to prepare the starting solution, but other solvents may be used to change the drying property of the starting solution. A small amount of additives such as a UV absorber, a dye, a peeling accelerator, and a lubricant used to give a function may be added to the chiral agent solution. When a solution in which additives are added to a solvent is used at the time of adding the additives, the solvent is preferably the same as the solvent of the starting solution.

In the step (c), it is preferable that a coating solution (curable liquid crystal composition) is prepared by mixing the chiral agent into the starting solution supplied from the tank in the middle of the pipe (the liquid supply pipe) before the coater (the coating unit) by the in-line mixing. The mixing method is not particularly limited and static mixing or dynamic mixing may be used. Heat may be applied thereto at the time of mixture.

In the production method according to the invention, it is preferable that the chiral agent is mixed by the use of a static mixer (also referred to as a stationary mixer) disposed in the liquid supply pipe, because higher mixing performance can be achieved with a simple structure and without any contact with external air (a smaller amount of particles is mixed). The static mixer means a mixer having, for example, a structure of a static mixer made by Noritake Co., Ltd. or the like. For example, the mixer described in JP2001-205062A can be preferably used as the static mixer.

Step (d)

The production method according to the invention includes a step (d) of coating the resin film with the curable liquid crystal composition (the coating solution) after the mixing.

The curable liquid crystal composition (the coating solution) is preferably applied on the surface of a substrate such as a polymer film, a glass plate, or a quartz plate, or on the surface of an orientation film formed on the substrate as needed. The application of the curable liquid crystal composition (the coating solution) can be performed by the use of various methods such as a wire bar coating method, an extrusion coating method, a direct gravure coating method, a reverse gravure coating method, and a die coating method.

Step (e)

The production method according to the invention includes a step (e) of drying the applied curable liquid crystal composition to achieve a cholesteric liquid crystal phase.

In the configuration in which the curable liquid crystal composition is prepared as the coating solution containing a solvent, the cholesteric liquid crystal phase can be achieved by drying the applied curable liquid crystal composition (hereinafter, simply referred to as "a coating film") to remove the solvent. The coating film may be heated up to the transition temperature to the cholesteric liquid crystal phase. For example, the cholesteric liquid crystal phase can be stably achieved by heating the coating film up to an isotropic phase temperature and then cooling the coating film up to the cholesteric liquid crystal phase transition temperature. The liquid crystal phase transition temperature of the curable liquid crystal composition is preferably in the range of 10° C. to 250° C. and more preferably in the range of 10° C. to 150° C., from the viewpoint of production fitness. When the liquid crystal phase transition temperature is lower than 10° C., a cooling step or the like may be necessary to lower the temperature to the temperature range in which the liquid crystal phase is exhibited. When the liquid crystal phase transition temperature is higher than 200° C., a high temperature is required for temporarily achieving the isotropic liquid phase of a temperature higher than the temperature range in which the liquid crystal phase is exhibited, whereby the thermal energy is wasted. The deformation or alteration of the used substrate may be caused.

Step (f)

The production method according to the invention includes a step (f) of forming the light-reflecting layer by proceeding a curing reaction of the curable liquid crystal composition to fix the cholesteric liquid crystal phase.

The curing reaction can be made to proceed, for example, by irradiation with active radiation such as ultraviolet rays. When the ultraviolet rays are used, a light source such as an ultraviolet lamp is used. In this step, by the irradiation with the ultraviolet rays, the curing reaction of the liquid crystal composition proceeds and the cholesteric liquid crystal phase is fixed, whereby the light-reflecting layer exhibiting the selective light-reflecting characteristic is formed.

The irradiation energy of the ultraviolet rays is not particularly limited, but is preferably in the range of 100 mJ/cm$^2$ to 800 mJ/cm$^2$. The time of irradiating the coating film with the ultraviolet rays is not particularly limited, and is determined from both viewpoints of the sufficient strength of the cured film (the light-reflecting layer) and the productivity.

To promote the curing reaction, the ultraviolet rays may be applied in the heated state. The irradiation temperature of the ultraviolet rays is preferably maintained in the temperature range in which the cholesteric liquid crystal phase is exhibited so as not to disturb the cholesteric liquid crystal phase. The oxygen concentration of the curing reaction atmosphere is involved in the degree of polymerization. Accordingly, when a desired degree of polymerization is not reached by the curing reaction in the air and the film strength is not sufficient, the oxygen concentration in the curing reaction atmosphere is preferably lowered by the use of nitrogen replacement or the like. The oxygen concentration is preferably equal to or less than 10 vol %, more preferably equal to or less than 7 vol %, and still more preferably equal to or less than 3 vol %.

In the step (f), the cholesteric liquid crystal phase is fixed to form a light-reflecting layer. Here, as the state where the liquid crystal phase is "fixed", a state where the orientation of the liquid crystal compound in the cholesteric liquid crystal phase is maintained is the most typical and preferable, but the invention is not limited to this state. Specifically, it means a state where the light-reflecting layer does not have fluidity in the temperature range of 0° C. to 50° C. or in the temperature range of −30° C. to 70° C. under the severe conditions and the fixed orientation is stably maintained without causing a variation in the orientation due to an external field or an external force. In the invention, the orientation of the cholesteric liquid crystal phase is fixed through the use of the curing reaction proceeding by the irradiation with the ultraviolet rays.

In the invention, the optical characteristics of the cholesteric liquid crystal phase has only to be maintained in the light-reflecting layer and the final liquid crystal composition in the light-reflecting layer need not exhibit the liquid crystal characteristic yet. For example, the liquid crystal composition may increase in molecular weight by the curing reaction to lose the liquid crystal characteristics.

Step (g)

The production method according to the invention preferably includes a step (g) of laminating another light-reflecting layer on the light-reflecting layer by repeatedly performing at least one time the steps (a) to (f) (that is, performing the steps (a) to (f) at least two times) while changing the concentration or kind of the chiral agent. The production method according to the invention can be preferably employed to form a laminated body having two or more light-reflecting layers.

To provide a light-reflecting film having high heat-shielding performance, it is necessary to stack light-reflecting layers having different concentrations or kinds (right-handed twist and left-handed twist) of the chiral agent. In the known method of producing a light-reflecting film, since a coating solution having a different concentration of the chiral agent is prepared for each light-reflecting layer, a cleaning process is performed to replace the coating solution, or plural solution-preparing tanks are provided, there is a problem in that the cost increases. On the contrary, in the production method according to the invention, since the chiral agent is inline-added, only the concentration or kind of the chiral agent has only to be changed at the time of laminating two or more light-reflecting layers. Therefore, it is possible to easily produce a light-reflecting film having two or more light-reflecting layers.

Feedback Control Step

The production method according to the invention preferably includes a step of measuring the central reflection wavelength of the light-reflecting film obtained through the above-mentioned steps and a step of controlling the amount of the chiral agent added by feeding back the measured central reflection wavelength. The feedback method is not particularly limited and known methods can be used. At this time, it is preferable that the additive amount of chiral agent is adjusted while feeding back the optical data of the inline meter in a state where the curable liquid crystal composition is continuously applied. Regarding the feedback control method, the method and device described, for example, in JP2006-258880A can be used.

Materials

Materials used in the production method according to the invention will be described below. The production method according to the invention uses the curable liquid crystal compound and the chiral agent. In the production method according to the invention, it is preferable that the orientation-control agent is used, from the viewpoints of controlling the light-reflecting property of the resultant light-reflecting layers with higher precision and improving the orientation property. In the production method according to the invention, it is preferable that the polymerization initiator is used to promote the curing of the curable liquid crystal composition.

Curable Liquid Crystal Compound

The curable liquid crystal compound used in the production method according to the invention may be a rod-like liquid crystal compound or a disc-like liquid crystal compound, but the rod-like liquid crystal compound is preferably used.

An example of the rod-like liquid crystal compound used in the invention is a rod-like nematic liquid crystal compound. Examples of the rod-like nematic liquid crystal compound include azomethines, azoxys, cyanobiphenyls, cyanophenylesters, benzoic esters, cyclohexanecarboxylic phenylesters, cyanophenyl cyclohexanes, cyano-substituted phenylpyrimidines, alkoxy-substituted phenylpyrimidines, phenyldioxanes, tolans, and alkenylcyclohexyl benzonitriles. The rod-like liquid crystal compound may be a low-molecular compound or a high-molecular compound.

In the production method according to the invention, the curable liquid crystal composition exhibits the cholesteric liquid crystal phase and at least one kind of cholesteric liquid crystal compound is preferably used as the curable liquid crystal compound.

The curable liquid crystal compound used in the invention may be polymerizable or non-polymerizable. The rod-like liquid crystal compounds not having a polyermizable group are described in various documents (for example, Y. Goto et. al., Mol. Cryst. Liq. Cryst. 1995, Vol. 260, pp. 23-28).

The polymerizable rod-like liquid crystal compounds can be acquired by introducing a polymerizable group into the rod-like liquid crystal compound. Examples of the polymerizable group include an unsaturated polymerizable group, an epoxy group, and an aziridinyl group. The unsaturated polymerizable group can be preferably used and an ethylene unsaturated polymerizable group can be more preferably used. The polymerizable group can be introduced into molecules of the rod-like liquid crystal compound through the use of various methods. The number of polymerizable groups in a polymerizable rod-like liquid crystal compound is preferably in the range of 1 to 6 and more preferably in the range of 1 to 3. Examples of the polymerizable liquid crystal compound include compounds described in Makromol. Chem., vol. 190, pp. 2255 (1989), Advanced Materials, vol. 5, pp. 107 (1993), U.S. Pat. Nos. 4,683,327B, 5,622,648B, 5,770,107B, WO95/22586, WO95/24455, WO97/00600, WO98/23580, WO98/52905, JP1989-272551A (JP-H1-272551A), JP 1994-16616A (JP-H6-16616A), JP 1995-110469A (JP-H7-110469A), JP 1999-80081 A (JP-H11-80081A), JP2001-328973A, and the like. The polymerizable rod-like liquid crystal compounds may be used singly or in a combination of two or more. When two or more kinds of polymerizable rod-like liquid crystal compounds are used in combination, it is possible to lower the orientation temperature.

Chiral Agent (Optically-Active Compound)

The curable liquid crystal composition exhibits the cholesteric liquid crystal phase and thus contains an optically-active compound. The optically-active compound can be selected from various known chiral agents (for example, see Liquid Crystal Device Handbook, Chap. 3, Sec. 4-3 TN, STN Chiral Agent, pp. 199, the 142-th Committee of the Japan Society for the Promotion of Science, 1989). The chiral agent generally contains asymmetric carbon atoms, but an axial asymmetric compound or a planar asymmetric compound not containing any asymmetric carbon atom can be used as the chiral agent. Examples of the axial asymmetric compound or the planar asymmetric compound include binaphthyl, helicene, paracyclophane, and derivatives thereof. The chiral agent may have a polymerizable group. When the optically-active compound has a polymerizable group and the rod-like liquid crystal compound used together therewith has a polymerizable group, polymers having the repeating unit derived from the rod-like liquid crystal compound and the repeating unit derived from the optically-active compound can be formed through the use of the polymerization reaction between the polymerizable optically-active compound and the polymerizable rod-like liquid crystal compound. In this aspect, the polymerizable group of the polymerizable optically-active compound is preferably the same kind of group as the polymerizable group of the polymerizable rod-like liquid crystal compound. Therefore, the polymerizable optically-active compound is preferably the unsaturated polymerizable group, the epoxy group, or the aziridinyl group, more preferably the unsaturated polymerizable group, and still more preferably the ethylene unsaturated polymerizable group.

The chiral agent may be a liquid crystal compound.

The content of the chiral agent in the curable liquid crystal composition is preferably in the range of 1 to 10 mass %, more preferably in the range of 1 to 7 mass %, and still more preferably in the range of 1 to 5.1 mass %.

It is preferable that the amount of the chiral agent used is smaller, because it has a smaller influence on the liquid crystal characteristics. Therefore, a compound having a strong twisting force is preferably used as the chiral agent so as to achieve the twisting orientation of a desired helical pitch even with a small amount. Examples of the chiral agent having a strong twisting force include the chiral agents described in JP2003-287623A and can be preferably used in the invention.

Orientation-Control Agent

Preferable examples of the orientation-control agent used in the invention include compounds expressed by General Formulas I to IV. Two or more kinds selected therefrom may be used in combination. These compounds can reduce the tilt angle of molecules of the curable liquid crystal compound or can substantially horizontally orient the molecules thereof at the air interface of the light-reflecting layer.

In this specification, the "horizontal orientation" means that the long-axis direction of the liquid crystal module is parallel to the film in-plane direction, but does not require that they are exactly parallel to each other. In this specification, the horizontal orientation is assumed as meaning that the tilt angle in the long-axis direction of the liquid crystal molecule about the film in-plane direction is less than 20 degrees. When the curable liquid crystal compound is horizontally oriented in the vicinity of the air interface, the orientation defects hardly occur. Accordingly, the transparency in the visible light region increases and the reflectance in the infrared light region increases. On the other hand, when the molecules of the curable liquid crystal compound are oriented with a large tilt angle, the helical axis of the cholesteric liquid crystal phase is offset from the film normal line. Accordingly, the reflectance decreases or a fingerprint pattern occurs to increase the haze or to exhibit a diffraction property, which is not preferable.

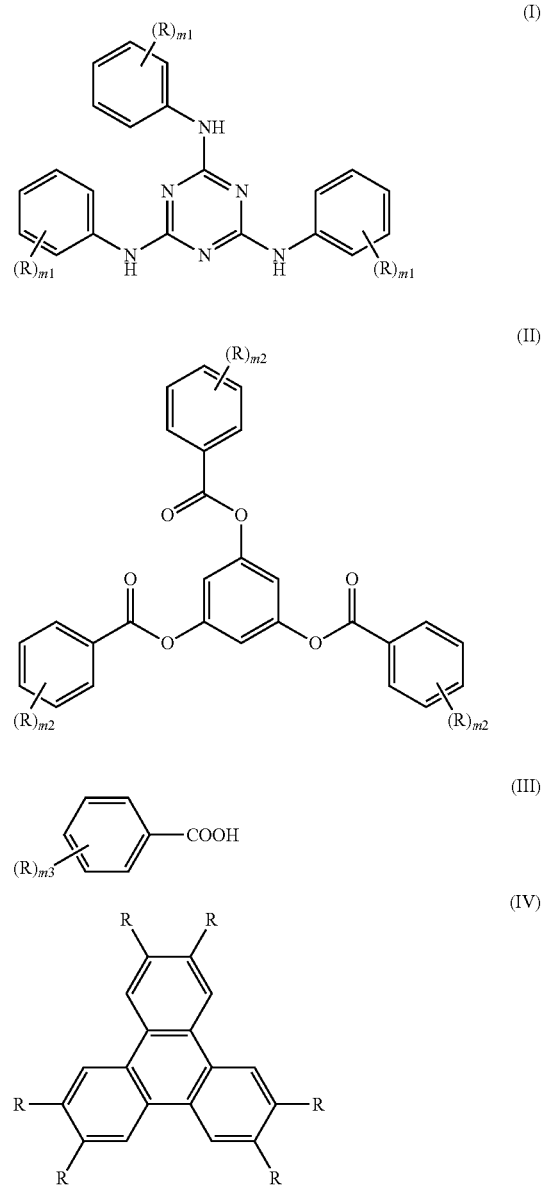

In the general formulas, R may be equal or different and represents an alkoxy group with a carbon number of 1 to 30 which may be substituted with fluorine atoms, preferably an alkoxy group with a carbon number of 1 to 20, and more preferably an alkoxy group with a carbon number of 1 to 15. Here, one or more $CH_2$ and two or more $CH_2$ not adjacent to each other in the alkoxy group may be substituted with —O—, —S—, —COO—, —COO—, —$NR^a$—, —$NR^a$CO—, —$CONR^a$—, —$NR^a SO_2$—, or —$SO_2 NR^a$—. $R^a$ represents a hydrogen atom or an alkyl group with a carbon number of 1 to 5.

By substituting R with one or more fluorine atoms, the orientation-control agent is eccentrically located at the air interface of the light-reflecting layer and the elution or diffusion into the upper layer is facilitated, which is preferable. The carbon atom at the terminal is preferably substituted with a fluorine atom and the terminal more preferably has a perfluoroalkyl group.

Preferable examples of R include the following functional groups.

$OC_nH_{2n+1}$
$(OC_2H_4)_{n1}(CF_2)_{n2}F$
$(OC_3H_6)_{n1}(CF_2)_{n2}F$
$(OC_2H_4)_{n1}NR^aSO_2(CF_2)_{n2}F$
$(OC_3H_6)_{n1}NR^aSO_2(CF_2)_{n2}F$

In the formulas, n, n1, and n2 represent an integer equal to or greater 1. n is preferably in the range of 1 to 20 and more preferably in the range of 5 to 15. n1 is preferably in the range of 1 to 10 and more preferably in the range of 1 to 5. n2 is preferably in the range of 1 to 10 and more preferably in the range of 2 to 10.

In the above-mentioned formulas m1, m2, and m3 represent an integer equal to or greater than 1.

m1 is preferably 1 or 2 and more preferably 2. When m1 is 1, R is preferably added to the para position. When m1 is 2, R is preferably added to the para position and the meta position.

m2 is preferably 1 or 2 and more preferably 1. When m2 is 1, R is preferably added to the para position. When m2 is 2, R is preferably added to the para position and the meta position.

m3 is preferably in the range of 1 to 3 and R is preferably added to two meta positions and one para position in —COOH.

Examples of the compound defined by Formula I include the compounds described in paragraphs [0114] and [0115] of JP2005-99248A.

Examples of the compound defined by Formula II include the compounds described in paragraphs [0117] to [0118] and paragraphs [0119] to [0120] of JP2002-129162A.

Examples of the compound defined by Formula III include the compounds described in paragraphs [0122] and [0123] of JP2005-99248A.

Examples of the compound defined by Formula IV include the compounds described in paragraph [0125] of JP2005-99248A.

The amount of the orientation-control agent used is preferably in the range of 0.1 to 20 mass % with respect to the curable liquid crystal compound (the solid content in case of the coating solution) and more preferably in the range of 1 to 8 mass %.

Polymerization Initiator

The curable liquid crystal composition used to form the light-reflecting layer is preferably a polymerizable liquid crystal composition and thus preferably contains a polymerizable initiator. In the configuration in which the curing reaction is made to proceed by the irradiation with ultraviolet rays, the used polymerizable initiator is preferably a photopolymerization initiator which can initiate the polymerization reaction by the irradiation with ultraviolet rays. Examples of the photopolymerization initiator include α-carbonyl compounds (U.S. Pat. Nos. 2,367,661B and 2,367,670B), acyloin ethers (U.S. Pat. No. 2,448,828B), α-hydrocarbon-substituted aromatic acyloin compounds (U.S. Pat. No. 2,722,512B), polyneclear quinone compounds (U.S. Pat. No. 3,046,127B) and U.S. Pat. No. 2,951,758), combinations of triarylimidazole dimer and p-aminophenyl ketone (U.S. Pat. No. 3,549,367B), acridine and phenazine compounds (JP 1985-105667A (JP-S60-105667) and U.S. Pat. No. 4,239,850B), and oxadiazole compounds (U.S. Pat. No. 4,212,970B).

The amount of the photopolymerization initiator to be used is preferably in the range of 0.1 to 20 mass % with respect to the curable liquid crystal compound (the solid content in case of the coating solution) and more preferably in the range of 1 to 8 mass %.

Other Additives

The curable liquid crystal composition may further contain at least one kind selected from various additives such as a non-uniformity inhibitor, an elasticity inhibitor, and polymerizable monomers so as to improve the orientation uniformity, the coating fitness, and the film strength. A polymerization inhibitor, an antioxidant, a UV absorber, a light stabilizer, a coloring agent, metal oxide particulates, and the like may be added to the curable liquid crystal composition as needed within the range in which the optical performance of the light-reflecting layer is deteriorated.

Solvent for Dissolving Curable Liquid Crystal Compound

The solvent for dissolving the curable liquid crystal compound is not particularly limited and known solvents can be used. Examples thereof include ketones (such as acetone, 2-butanone, methylisobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl acetate, ethyle acetate, and butyl acetate), water, alcohols (such as ethanol, isopropanol, butanol, and cyclohexanol), cellosolves (such as methyl cellosolve and ethyl cellosolve), cellosolve acetates, sulfoxides (such as dimethyl sulfoxide), and amides (such as dimethylformamide and dimethylacetamide). In the production method according to the invention, it is preferably that 2-butanone is used, from the viewpoint of the solubility of solid and the efficiency in drying the coating film. On the other hand, a high-polarity solvent may be used to easily dissolve the orientation-control agent and specific examples thereof include toluene, methylethyl ketone, and N-methylpyrrolidone. These solvents can be used singly or in a combination of two or more kinds.

From the viewpoint of formation of a coating film and production efficiency, the solid content concentration in the curable liquid crystal composition is preferably in the range of 10 to 50 mass % and more preferably in the range of 15 to 40 mass %.

Resin Film

The resin film used in the method of producing a light-reflecting film according to the invention is not particularly limited and a light-reflecting layer can be formed on any resin film to produce the light-reflecting film according to the invention. For example, a polymer film having high transmittance of visible rays can be used as the resin film.

Examples of the polymer film having high transmittance of visible rays include various polymer films for an optical film which are used as members of display devices such as a liquid crystal display device. Examples of the resin film include polyester films of polyethylene terephthalate (PET), polybutylene terephthalate, and polyethylene naphthalate (PEN), polycarbonate (PC) films, polymethylmethacrylate films, polyolefin films of polyethylene and polypropylene, polyimide films, and triacetylcellulose (TAC) films. The polyethylene terephthalate films and the triacetylcellulose films are more preferable and the polyethylene terephthalate films are still more preferable.

Production Equipment

Production equipment preferably used in the production method according to the invention will be described below with reference to the accompanying drawing.

Figure 3:
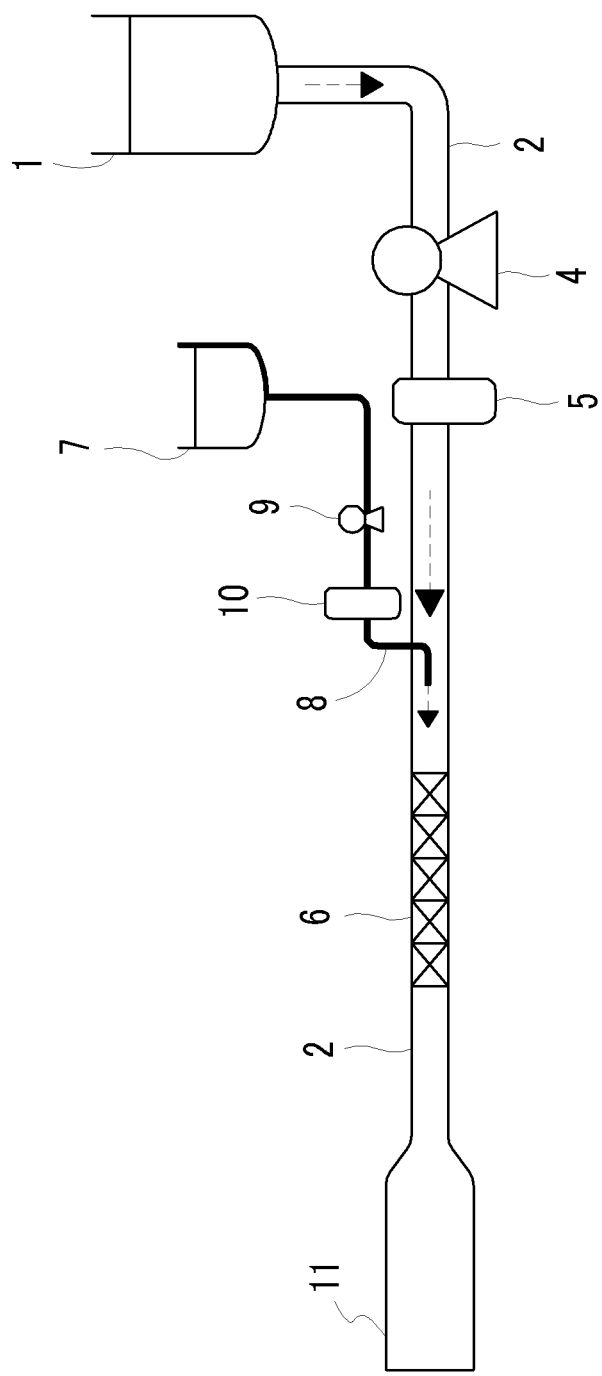
FIG. 3 is a diagram schematically illustrating the configuration of production equipment used in the production method according to the invention.

FIG. 3 is a diagram schematically illustrating the configuration of the production equipment preferably used in the production method according to the invention. In FIG. 3, reference numeral 1 represents a starting solution storage tank storing a starting solution prepared in advance and the starting solution storage tank 1 is connected to a coater 11 via a liquid supply pipe 2. In the liquid supply pipe 2, a pump 4, a filter 5, and a static mixer 6 are disposed from the starting solution storage tank 1 side. Reference numeral 7 represents a solvent tank storing a chiral agent (or a chiral agent solution) and the chiral agent tank 7 is connected to the upstream side of the static mixer 6 of the liquid supply pipe 2 via a chiral agent supply pipe 8. In the chiral agent supply pipe 8, a pump 9 and a filter 10 are disposed from the chiral agent tank 7 side. Reference numeral 11 schematically shows the coater and the type, position, and the like of the coater are not limited to those shown in FIG. 3.

In the production equipment, since a starting solution is supplied to the coater 11 from the starting solution storage tank 1 by the use of the pump 4 and the chiral agent is also supplied to the liquid supply pipe 2 from the chiral agent tank 7 by the use of the pump 9 at that time, the chiral agent is mixed into the starting solution upstream from the static mixer 6 and both are uniformly mixed through the use of the static mixer 6. Therefore, the curable liquid crystal composition into which the chiral agent has been mixed and which is introduced into the coater 11 is a homogeneous solution with a desired concentration range. A resin film is coated with the solution through the use of the coater 11 to form a light-reflecting layer.

In the configuration in which the chiral agent is added as a solution by the in-line mixing, when the concentration of the chiral agent in the light-reflecting layer is changed, the flow rate of the chiral agent solution supplied to the liquid supply pipe 2 from the chiral agent tank 7 is changed to be a desired concentration.

When the kind of the chiral agent contained in the light-reflecting layer is changed, the chiral agent in the chiral agent tank 7 may be replaced with another kind of chiral agent, or a chiral agent may be contained in another chiral agent tank (not shown) and another kind of chiral agent may be inline-added to the starting solution via another pipe.

In the production method according to the invention, a chiral agent concentration meter (not shown) is preferably provided which feeds back the measured data of the central reflection wavelength of the light-reflecting film to control the amount of chiral agent inline-added from the chiral agent tank 7.

Light-Reflecting Film

The light-reflecting film according to the invention is produced through the use of the method of producing a light-reflecting film according to the invention and has a wavelength region in which 30% or more of incident light is reflected in the infrared light region of 800 to 2000 nm. The light-reflecting film according to the invention will be described below.

Configuration

Figure 2:
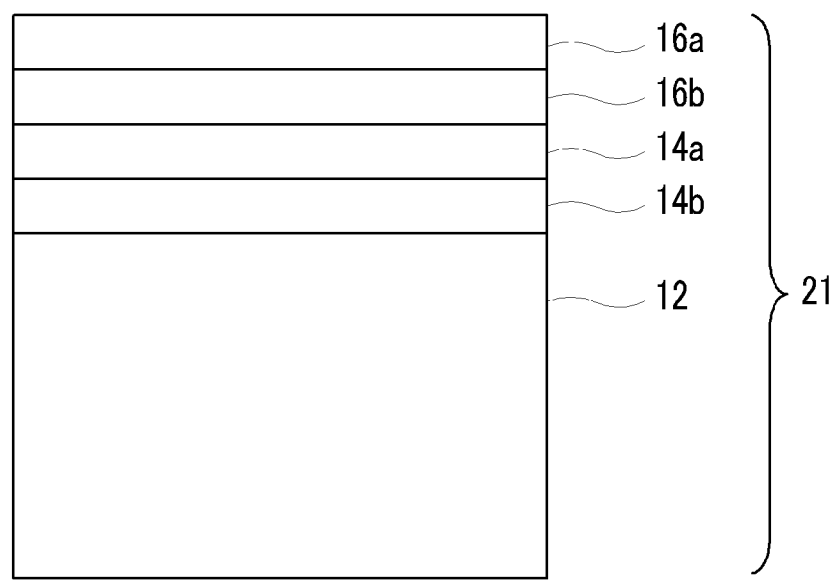
FIG. 2 is a cross-sectional view schematically illustrating another example of the light-reflecting film produced by the production method according to the invention.

Examples of the light-reflecting film produced through the use of the production method according to the invention are shown in FIGS. 1 and 2.

The light-reflecting film 21 shown in FIG. 1 includes a light-reflecting layer 14b in which the cholesteric liquid crystal phase is fixed and which is formed on one surface of a resin film 12. The light-reflecting film 21 shown in FIG. 2 further includes light-reflecting films 14a, 16a, and 16b, in which the cholesteric liquid crystal phase is fixed, formed thereon. The light-reflecting film according to the invention is not limited to these configurations, and a configuration in which six or more light-reflecting layers are stacked can be preferably employed.

In the light-reflecting films 21 shown in FIGS. 1 and 2, since the respective light-reflecting layers are formed by fixing the cholesteric liquid crystal phase, the light-reflecting film exhibits a selective light-reflecting property of reflecting light of a specific wavelength on the basis of the helical pitch of the corresponding cholesteric liquid crystal phases. For example, when the neighboring light-reflecting layers (14a and 14b or 16a and 16b) have a nearly-equal helical pitch and exhibit the optical rotation properties in the opposite directions, it is possible to reflect both a right-handed circularly-polarized beam and a left-handed circularly-polarized beam of the nearly-equal wavelength, which is preferable. In an example of the light-reflecting film 21 shown in FIG. 2, the light-reflecting layer 14a of the light-reflecting layers 14a and 14b is formed of a curable liquid crystal composition containing a right-rotation chiral agent, the light-reflecting layer 14b is formed of a curable liquid crystal composition containing a left-rotation chiral agent, and the light-reflecting layers 14a and 14b have a nearly-equal helical pitch.

In another example of the light-reflecting film 21 shown in FIG. 2, the relationship between the light-reflecting layers 14a and 14b are the same as in the above-mentioned example of the light-reflecting film 21 (both helical pitches are d14 nm), the light-reflecting layer 16a is formed of a curable liquid crystal composition containing a right-rotation chiral agent, the light-reflecting layer 16b is formed of a curable liquid crystal composition containing a left-rotation chiral agent, the helical pitches in the light-reflecting layers 16a and 16b are nearly equal (both helical pitches are d16 nm), and a condition d14≠d16 is satisfied. The light-reflecting film 21 satisfying these conditions achieves the same advantages as the example of the light-reflecting film 21 and the wavelength band of light to be reflected by the light-reflecting layers 16a and 16b expands, thereby exhibiting a wide-band light-reflecting property. The invention is not limited to the even number of light-reflecting layers, but an odd number of layers may be formed.

The light-reflecting film produced through the use of the production method according to the invention exhibits a selective reflection characteristic based on the cholesteric liquid crystal phases of the respective layers. The light-reflecting film according to the invention may have a light-reflecting layer in which one of right-twisted and left-twisted cholesteric liquid crystal phases is fixed. When the light-reflecting layers in which the right-twisted and left-twisted cholesteric liquid crystal phases of the same helical pitches are fixed are formed, the selective reflectance of light of a specific wavelength increases, which is preferable. When plural pairs of light-reflecting layers in which the right-twisted and left-twisted cholesteric liquid crystal phases of the same helical pitches are fixed are formed, it is possible to raise the selective reflectance and to widen the selective reflection wavelength region, which is preferable.

The rotation direction of the cholesteric liquid crystal phase can be adjusted by the use of the kinds of the rod-like liquid crystal compound or the kind of the chiral agent to be added, and the helical pitch can be adjusted by the use of the concentrations of the materials.

Characteristics

The total thickness when the light-reflecting film is a stacked body having two or more light-reflecting layers is not particularly limited. However, in the configuration in which the light-reflecting film includes four or more light-reflecting layers in which a cholesteric liquid crystal phase is fixed and exhibits the light-reflecting characteristic over the infrared light region, that is, in the configuration in which the light-reflecting film exhibits the heat-shielding property, the thickness of each light-reflecting layer is in the range of 3 to 6 μm and the total thickness of the light-reflecting film is generally in the range of 15 to 40 μm.

The selective reflection wavelength of one light-reflecting layer (each light-reflecting layer in the case where the light-reflecting film includes plural light-reflecting layers) of the light-reflecting film according to the invention is not particularly limited. By adjusting the helical pitch depending on its application, it is possible to give the reflection characteristic for light of a desired wavelength. For example, at least a light-reflecting film can be provided which is a so-called infrared light-reflecting film reflecting a part of light in the infrared light wavelength region of 800 nm to 2000 nm. This light-reflecting film exhibits the heat-shielding property. Another example of the light-reflecting film according to the invention is a light-reflecting film which can reflect 80% or more (more preferably 90% or more) of solar rays in the wavelength range of 900 nm to 1160 nm. When a window film is produced using this light-reflecting film, it is possible to achieve high heat-shielding performance in which the shielding factor defined in JIS A-5759 (a film for a construction glass window) is equal to or less than 0.7.

The light-reflecting film according to the invention can achieve a low haze and can suppress the haze around a single light-reflecting layer in which the cholesteric liquid crystal phase is fixed so as to be less than 0.2%. Preferably, the light-reflecting film according to the invention includes the chiral agent of which the HTP defined by Expression 1 is equal to or greater than 30 µm$^{-1}$ and at least one light-reflecting layer in which the cholesteric liquid crystal phase is fixed and the haze is equal to or less than 0.2% is stacked thereon.

HTP=Refractive Index of Curable Liquid Crystal Compound/{Selective Reflection Wavelength (unit: µm) of Cholesteric Liquid Crystal Phase× Ratio of Chiral Agent to Curable Liquid Crystal Compound}. Expression 1

Since a light-reflecting film bonded to a window or the like requires transparency, the lower haze is more preferably. The haze is preferably equal to or less than 0.15%.

The haze can be measured on the basis of the JIS K-7136: 2000 (a method of calculating a haze of a plastic-transparent material). When the light-reflecting film according to the invention includes plural light-reflecting layers, the haze may be measured while peeling off each light-reflecting layer from the light-reflecting film, and the peeling method is not particularly limited.

Shape

The light-reflecting film according to the invention may have a sheet-like spread shape or a shape wound on a roll, and preferably has a shape wound on a roll. The light-reflecting film according to the invention can maintain excellent optical characteristics even when the winding and the delivery are repeated in the production process, and can also maintain excellent optical characteristics even when it is stored or transported in the state where the produced light-reflecting film is wound on a roll.

The light-reflecting film according to the invention may be a member having such a self-supporting property that it can be used as a window material or may be a member not having a self-supporting property but being bonded to a substrate such as a glass plate having a self-supporting property.

When the cholesteric liquid crystal phase is fixed, a single layer includes only any one of the right-handed circularly-polarized light component and the left-handed circularly-polarized light component and exhibits 50% reflection performance to the maximum. By repeatedly laminating a layer reflecting the right-handed circularly-polarized light component and a layer reflecting the left-handed circularly-polarized light component, it is possible to enhance the reflection performance up to 100% to the maximum. The width of the reflection wavelength band is generally in the range of 100 to 150 nm, but the reflection wavelength band can be widened to the range of 150 to 300 nm by using a material having high birefringence Δn in the cholesteric liquid crystal phase or adjusting the chiral agent concentration distribution in the film section direction of the chiral agent in the produced film.

Usage

The usage of the light-reflecting film according to the invention is not particularly limited, but is preferably a window-attaching light-reflecting film.

The light-reflecting film according to the invention may be used in the state where it is bonded to the surface of a glass plate or a plastic substrate. In this case, the bonding surface of the light-reflecting film to the glass plate or the like preferably has an adhesive property. In this embodiment, the light-reflecting film according to the invention preferably has an adhesive layer or a highly-adhesive layer which can be bonded to the surface of a substrate such as a glass plate. The non-adhesive light-reflecting film according to the invention not including an adhesive layer or a highly-adhesive layer may be bonded to the surface of a glass plate with an adhesive agent.

The light-reflecting film according to the invention preferably exhibits the heat-shielding property with respect to solar rays and preferably efficiently reflects the infrared rays of 700 nm or greater in solar rays.

The light-reflecting film according to the invention can be used as a heat-shielding window itself for a vehicle or a building or can be used as a sheet or film to be bonded to a window of a vehicle or a building. In addition, the light-reflecting film according to the invention can be used as a freezer showcase, an agricultural house material, an agricultural reflecting sheet, and a solar cell film. The light-reflecting film according to the invention can be preferably used as a window-attaching light-reflecting film, in view of characteristics such as high transmittance of visible rays and a low haze.

The light-reflecting film according to the invention may be assembled as a heat-shielding member into reinforced glass.

The heat-shielding member is bonded as a solar ray shielding member to windows of buildings such as houses or office buildings or vehicles such as cars. Alternatively, the light-reflecting film according to the invention can be used as a solar ray shielding member itself (for example, as a heat-shielding glass or a heat-shielding film).

EXAMPLES

The features of the invention will be more specifically described below with reference to examples and comparative examples (where the comparative example is not a known technique). Materials, amounts, ratios, process details, process sequences, and the like to be described in the following examples can be appropriately modified without departing from the concept of the invention. Therefore, the scope of the invention should not be limited by the following specific examples.

Example 1

Preparation of Coating Solution (Curable Liquid Crystal Composition)

First, a coating solution having the compositions shown in Table 1 was prepared.

Starting Solution

TABLE 1

| Material (kind) | Material name (maker) | Prescribed amount (part by mass) |
|---|---|---|
| Rod-like liquid crystal compound | RM-257 (Merck) | 100 |
| Polymerization initiator | Irg-819 (BASF) | 4.19 |
| Orientation-control agent | Orientation-control agent: compound 1 (compound described in JP2005-99248A) | 1.6 |

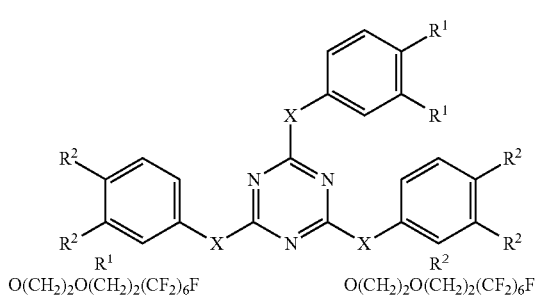

| | | |
|---|---|---|
| $R^1$ | $R^2$ | X |
| $O(CH_2)_2O(CH_2)_2(CF_2)_6F$ | $O(CH_2)_2O(CH_2)_2(CF_2)_6F$ | NH |

| solvent | 2-butanone (Wako Pure Chemical Industries Ltd.) | 156.05 |

TABLE 2

Chiral Agent Solution

| Material (kind) | Material name (maker) | HTP |
|---|---|---|
| Chiral agent A | LC-756 (BASF) | 70.1 |
| Chiral agent B | Below compound | 31.9 |
| Chiral agent C | Below compound | 28.7 |
| Solvent | 2-butanone (Wako Pure Chemical Industries Ltd.) | — |

Chiral Agent B: Compound 5 described in JP2002-80478A

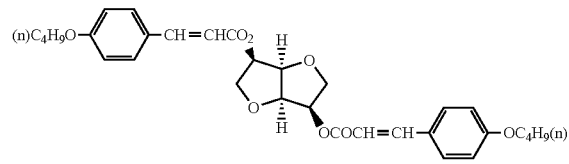

Left-handed twist
Mw = 550.64

Chiral Agent C: Compound 7 described in JP2002-80478A

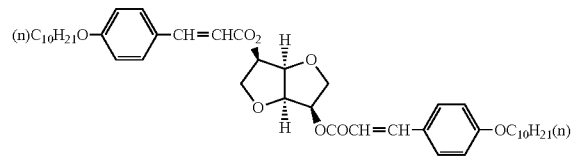

Left-handed twist
Mw = 718.96

A light-reflecting film was formed by the use of the production equipment shown in FIG. 3.

The starting solution shown in Table 1 was prepared in the starting solution storage tank 1 and was supplied to the coater 11 through the use of the pump 4. After the starting solution passed through the filter 5, the chiral agent shown in Table 2 was inline-added to the starting solution from the chiral agent tank 7 via the chiral agent supply pipe 8 through the use of the pump 9 in the middle of the liquid supply pipe 2 and was mixed through the use of the static mixer 6 to prepare a coating solution. The additive concentration was adjusted as described in table 3 so that the central reflection wavelength of the resultant light-reflecting film is 1000 nm. When the in-line mixing was performed in Example 1 and the like, the optical performance was adjusted by adjusting the additive amount of the chiral agent while feeding back the optical data of the inline meter (not shown) and continuously performing the coating operation.

At this time, the chiral agent was dissolved in the solvent shown in Table 2 and was inline-added.

Coating and Formation of Film

The prepared coating solution was applied onto a PET film with a thickness of 50 μm made by Fuji Film Co., Ltd. at a room temperature by the use of a wire bar so that the thickness of the dried film is in the range of 4 to 5 μm.

The resultant was dried at the room temperature for 30 seconds and was heated in the atmosphere of 85° C. for 4 minutes to achieve a cholesteric liquid crystal phase.

Thereafter, the resultant was irradiated with the LTV rays with an illumination intensity of 28.3 mW/cm² in the nitrogen atmosphere of 30° C. for 3 seconds while adjusting the power of a metal halide lamp available from EYE GRAPHICS CO., LTD. to fix the cholesteric liquid crystal phase, whereby a light-reflecting film according to Example 1 was produced.

Example 2 and Comparative Examples 1 to 4

Light-reflecting films according to the examples and the comparative examples were produced in the same way as Example 1, except that the kinds of the chiral agent, the additive amounts, and the execution of in-line mixing were changed as described in Table 3.

In Comparative Examples 2 to 4 in which the in-line mixing was not executed, the chiral agent was preliminarily introduced into the starting solution storage tank to prepare the coating solutions. When the central reflection wavelength of the produced light-reflecting film is offset from 1000 nm, the optical performance was adjusted by determining the additive amount on the basis of the data of the produced light-reflecting film, separately preparing a coating solution containing the determined amount of chiral agent, cleaning the liquid supply line and the coating unit, and then supplying and applying the separately-prepared coating solution again.

Offset from Target Value of Central Reflection Wavelength

The offset from the target value (1000 nm) of the central reflection wavelength of ten sheets of light-reflecting films obtained by performing the examples and the comparative examples ten times to produce a light-reflecting film while performing the feedback control using the above-mentioned method was measured. The calculation results of the average value were described in Table 3.

Haze

When the orientation performance of the cholesteric liquid crystal phase is deteriorated, the reflectance is lowered and the haze is markedly raised. Accordingly, the haze of the entire light-reflecting film was measured as an indicator of the orientation performance of the cholesteric liquid crystal phase. The haze was measured on the basis of the JIS K-7136: 2000 (a method of calculating a haze of a plastic-transparent material).

The results were described in Table 3. The haze was measured in the configuration in which a single light-reflecting layer (a cholesteric liquid crystal phase) is stacked on the resin film.

TABLE 3

| | Kind of chiral agent | HTP of chiral agent ($\mu m^{-1}$) | Additive amount of chiral agent (mass %) | In-line mixing | Offset from target value (1000 nm) of central reflection wavelength | Haze (%) |
|---|---|---|---|---|---|---|
| Example 1 | A | 70.1 | 2.1 | Done | 9 nm | 0.11 |
| Example 2 | B | 31.9 | 4.6 | Done | 8 nm | 0.17 |
| Com. Ex. 1 | C | 28.7 | 5.2 | Done | 6 nm | 0.28 |
| Com. Ex. 2 | A | 70.1 | 2.1 | None | 25 nm | 0.11 |
| Com. Ex. 3 | B | 31.9 | 4.6 | None | 19 nm | 0.18 |
| Com. Ex. 4 | C | 28.7 | 5.2 | None | 18 nm | 0.28 |

As can be seen from Table 3, in the light-reflecting film according to the invention, the offset from the target value of the central reflection wavelength was small and the haze was small. That is, the light-reflecting film according to the invention exhibited a high-precision light-reflecting characteristic and an excellent orientation property.

On the other hand, in Comparative Example 1 which is an example where the chiral agent of which the HTP is less than the range in the invention, the haze was raised. Comparative Examples 2 to 4 are examples where the chiral agent was mixed into the curable liquid crystal compound in advance to prepare a film when preparing the starting solution without inline-adding the chiral agent. In this case, the offset from the target value of the central reflection wavelength increased. Particularly, it could be seen from Comparative Example 4 that the haze rose with the decrease in the offset from the target value of the central reflection wavelength and thus both were not compatible, when a large amount of chiral agent of which the HTP is less than the range in the invention was used and the known method was employed without inline-adding the chiral agent.

Example 3

After a light-reflecting layer (referred to as a first light-reflecting layer) laminated in Example 1 was cooled to the room temperature, subsequently a second light-reflecting layer was formed on the first light-reflecting layer in the same way as Example 1, except that chiral agent A in Example 1 was replaced with chiral agent D having the below-described structure for right hand. The peak of the reflection wavelength of the light-reflecting film having the second light-reflecting layer was 1000 nm.

Third and fourth light-reflecting layers were laminated on the second light-reflecting layer in the same way as Example 1, except that the respective concentrations of chiral agent A and chiral agent D were adjusted so that the peak of the reflection wavelength is 1120 nm, and fifth and sixth light-reflecting layers were laminated in the same way as Example 1, except that the respective concentrations of chiral agent A and chiral agent D were adjusted so that the peak of the reflection wavelength is 1240 nm.

The resultant light-reflecting film exhibited the same tendency as Example 1.

Chiral Agent D

Compound 2

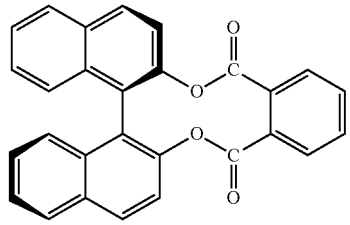

(described in JP2002-179668A)

What is claimed is:

1. A method of producing a light-reflecting film having a light-reflecting layer on a resin film and reflecting 30% or more of incident light of a wavelength in the range of 800 to 2000 nm, the method comprising:
supplying a starting solution prepared by dissolving a curable liquid crystal compound in a solvent;
mixing a chiral agent and the starting solution using an in-line mixing method to form a resultant coating solution, the chiral agent having an HTP of 30 $\mu m^{-1}$ or more expressed by HTP=Refractive Index of Curable Liquid Crystal Compound/{Selective Reflection Wavelength (unit: $\mu m$) of Cholesteric Liquid Crystal Phase× Ratio of Chiral Agent to Curable Liquid Crystal Compound};

coating the resin film with the resultant coating solution to form a curable liquid crystal composition layer;
drying the curable liquid crystal composition layer to form a cholesteric liquid crystal phase; and
curing the cholesteric liquid crystal phase to form the light-reflecting layer.

2. A method of producing a light-reflecting film having a light-reflecting layer on a resin film, and reflecting 30% or more of incident light of a wavelength in the range of 800 to 2000 nm, the method comprising the steps of:
(a) dissolving a curable liquid crystal compound in a solvent in a starting solution storage tank;
(b) supplying the resultant starting solution to a coater via a liquid supply pipe from the starting solution storage tank by the use of a pump;

(c) mixing a solution containing a chiral agent having an HTP of 30 μm$^{-1}$ or more expressed by Expression 1 into the supplied starting solution in the liquid supply pipe by an in-line mixing method;

(d) coating the resin film with the resultant curable liquid crystal composition;

(e) drying the coated curable liquid crystal composition to form a cholesteric liquid crystal phase; and (f) fixing the cholesteric liquid crystal phase by proceeding a curing reaction of the curable liquid crystal composition to form the light-reflecting layer:

HTP=Refractive Index of Curable Liquid Crystal Compound/{Selective Reflection Wavelength (unit: μm) of Cholesteric Liquid Crystal Phase× Ratio of Chiral Agent to Curable Liquid Crystal Compound}. Expression 1

3. The method of producing a light-reflecting film according to claim 1, wherein the mixing process of the chiral agent is carried out by the use of a static mixer disposed in the liquid supply pipe.

4. The method of producing a light-reflecting film according to claim 1, wherein at least one kind of cholesteric liquid crystal compound is used as the curable liquid crystal compound.

5. The method of producing a light-reflecting film according to claim 1, wherein the curable liquid crystal composition contains a photopolymerization initiator.

6. The method of producing a light-reflecting film according to claim 1, wherein the curable liquid crystal composition contains an orientation-control agent.

7. The method of producing a light-reflecting film according to claim 1, wherein the amount of the chiral agent added to the curable liquid crystal compound is 5.1% by mass or smaller.

8. The method of producing a light-reflecting film according to claim 1, wherein the HTP of the chiral agent is in the range of 35 to 95 μm$^{-1}$.

9. The method of producing a light-reflecting film according to claim 1, wherein the central reflection wavelength is in the range of 950 to 2000 nm.

10. The method of producing a light-reflecting film according to claim 1, further comprising the steps of:

measuring the central reflection wavelength; and controlling the amount of the chiral agent added by feedback from the measured central reflection wavelength.

11. The method of producing a light-reflecting film according to claim 2, further comprising a step of (g) laminating an additional light-reflecting layer on the light-reflecting layer wherein the additional light-reflecting layer includes a different concentration or kind of the chiral agent and repeatedly performing the steps of (a) to (f) at least once.

12. The method of producing a light-reflecting film according to claim 11, wherein at least a light-reflecting layer reflecting right-handed circularly polarized light and a light-reflecting layer reflecting left-handed circularly polarized light are formed.

13. The method of producing a light-reflecting film according to claim 1, wherein the resin film is a polyethylene terephthalate film.

14. The method of producing a light-reflecting film according to claim 1, producing a light-reflecting film for attaching to a window.

15. A light-reflecting film produced by the method according to claim 1, having a wavelength region to reflect 30% or more of incident light in the infrared light region of 800 to 2000 nm.

16. The method of producing a light-reflecting film according to claim 2, wherein at least one kind of cholesteric liquid crystal compound is used as the curable liquid crystal compound.

17. The method of producing a light-reflecting film according to claim 2, wherein the curable liquid crystal composition contains a photopolymerization initiator.

18. The method of producing a light-reflecting film according to claim 2, wherein the curable liquid crystal composition contains an orientation-control agent.

19. The method of producing a light-reflecting film according to claim 1, further comprising a step of laminating an additional light-reflecting layer on the light-reflecting layer wherein the additional light-reflecting layer includes a different concentration or kind of the chiral agent and repeatedly performing the steps of supplying, mixing coating, drying and curing at least once.

* * * * *